United States Patent [19]

Hertl et al.

[11] Patent Number: 5,771,684
[45] Date of Patent: Jun. 30, 1998

[54] GAS TREATMENT SYSTEMS

[75] Inventors: William Hertl, Corning; Donald L. Guile, Horseheads; Mallanagouda D. Patil, Corning; Jimmie L. Williams, Painted Post, all of N.Y.

[73] Assignee: Corning Incorporated, Corning, N.Y.

[21] Appl. No.: 575,426

[22] Filed: Dec. 20, 1995

Related U.S. Application Data

[63] Continuation-in-part of Ser. No. 484,617, Jun. 8, 1995, which is a continuation-in-part of Ser. No. 284,360, Aug. 2, 1994, abandoned.

[51] Int. Cl.[6] .................................................. F01N 3/20
[52] U.S. Cl. ........................... 60/274; 60/288; 60/297; 60/311; 137/833; 137/842
[58] Field of Search ............................ 60/324, 297, 288, 60/311, 274; 137/803, 806, 833, 842

[56] References Cited

U.S. PATENT DOCUMENTS

| | | | |
|---|---|---|---|
| 3,039,490 | 6/1962 | Carlson | 137/842 |
| 3,144,309 | 8/1964 | Sparrow | 60/288 |
| 3,503,410 | 3/1970 | Richards | 137/842 |
| 3,579,981 | 5/1971 | Gau | 60/324 |
| 3,699,683 | 10/1972 | Tourtellotte et al. . | |
| 3,783,619 | 1/1974 | Alquist | 60/288 |
| 3,966,443 | 6/1976 | Okano et al. . | |
| 3,988,890 | 11/1976 | Abthoff et al. | 60/288 |
| 3,995,423 | 12/1976 | Aoki et al. | 60/288 |
| 4,023,360 | 5/1977 | Wössner et al. | 60/288 |
| 4,196,170 | 4/1980 | Cemenska . | |
| 4,304,207 | 12/1981 | Aihara | 60/279 |
| 4,625,511 | 12/1986 | Scheitlin et al. . | |
| 5,051,244 | 9/1991 | Dunne et al. | 60/297 |
| 5,067,319 | 11/1991 | Moser | 60/288 |
| 5,089,236 | 2/1992 | Clerc . | |
| 5,125,231 | 6/1992 | Patil et al. | 60/297 |
| 5,140,811 | 8/1992 | Minami et al. | 60/297 |
| 5,144,796 | 9/1992 | Swars . | |
| 5,211,012 | 5/1993 | Swars . | |
| 5,271,906 | 12/1993 | Yuuki et al. . | |
| 5,315,824 | 5/1994 | Takeshima . | |
| 5,449,499 | 9/1995 | Bauer et al. . | |

FOREIGN PATENT DOCUMENTS

| | | |
|---|---|---|
| 0 661 098 A2 | 7/1995 | European Pat. Off. . |
| 144469 | 10/1980 | German Dem. Rep. ............... 137/833 |
| 1275772 | 5/1972 | United Kingdom ...................... 60/288 |
| 2 240 486 | 8/1991 | United Kingdom . |
| 95/18292 | 7/1995 | WIPO . |

*Primary Examiner*—Douglas Hart
*Attorney, Agent, or Firm*—Kees van der Sterre

[57] ABSTRACT

Flow diverter methods and apparatus useful, for example, in adsorber systems capable of meeting the California ultra-low emission vehicle (ULEV) standard, are described, the adsorber systems incorporating a combination of a burn-off catalyst and a modified adsorber constructed with an open flow region of substantially unobstructed flow having a hole or a region of larger cell openings, the flow diverter acting to control exhaust flow through the adsorber to both increase adsorption and reduce the light-off time of the burn-off catalyst.

24 Claims, 2 Drawing Sheets

GAS TREATMENT SYSTEMS

This application is a continuation-in-part of application Ser. No. 08/484,617 filed Jun. 8, 1995, which was a continuation-in-part of application Ser. No. 08/284,360 filed Aug. 2, 1994, now abandoned.

BACKGROUND OF THE INVENTION

The invention relates to systems for treating gas streams such as streams of exhaust gases from internal combustion engines, and more particularly to apparatus useful in such systems to improve system performance. Specific applications for such apparatus include in-line exhaust treatment systems for internal combustion engines. The improved systems of the invention are capable of meeting the California ultra-low emission vehicle (ULEV) standard though combinations of the apparatus with modified adsorber constructions.

Internal combustion engines emit large amounts of unburned hydrocarbons during the startup or so-called "cold start" interval, due to the rich fuel mixture used and the necessarily incomplete combustion which occurs at start-up. Elevated emissions of unburned hydrocarbons continue until the main catalyst reaches its "light-off" temperature, at which point the catalyst begins to convert the hydrocarbons to harmless gases. The ULEV standards require that the amount of hydrocarbons discharged into the atmosphere during cold-start be kept to extremely low levels.

Various schemes have been proposed for meeting the stringent ULEV standards during cold start, including the use of molecular sieve structures or other adsorbents to adsorb and hold significant amounts of hydrocarbons until the converter has attained its light-off temperature. For the purposes of the present description the light-off temperature of a converter is the temperature at which a catalytic converter can convert 50% of carbon monoxide or hydrocarbons to other species. The light-off time of a catalytic converter is the amount of time required to attain light-off temperature.

Improved in-line and by-pass exhaust control systems are disclosed in co-pending, commonly assigned U.S. patent application Ser. Nos. 08/234,680 and 08/259,459 (both herein incorporated by reference), those applications using bi-metallic valves to control exhaust gas flow during cold-start. In the former, a hollow molecular sieve structure having a bi-metallic valve is used to achieve the ULEV standards.

Co-pending, commonly assigned U.S. patent application Ser. Nos. 08/284,356 and 08/375,699 filed Aug. 2, 1994 and Jan. 19, 1995, respectively, and herein incorporated by reference, disclose a by-pass adsorber system wherein flow patterns from a secondary air source are used to direct exhaust gas flow to and away from the adsorber during cold-start.

The problems associated with the use of mechanical valving in exhaust gas treatment systems such as engine exhaust gas treatment systems have long been recognized. Valve failures due to damage from high temperatures and/or the corrosive exhaust environment are common. The use of non-mechanical flow controls, such as flow controls based on fluidic diversion of exhaust gas streams toward or away from conduits, catalysts or adsorber beds for treating such gases, has significant advantages over mechanical systems because of the very high resistance of the former types of controls to damage at high temperatures or under corrosive conditions. As used in the following description the term "fluidic" is used to generally describe the mechanism or process of diverting gas flow from a particular flow path using a smaller stream of gas or other fluid.

One example of such a fluidic system is that disclosed in British Patent application No. 2 240 486. In that system, a stream of control gas is used to force an exhaust gas stream away from a first portion and toward a second portion of a honeycomb structure for treating the exhaust gas stream.

Notwithstanding the foregoing developments, there continues to be a need for, and accordingly it is one object of the present invention to provide, even simpler and more dependable engine exhaust systems capable of meeting the strict California ULEV standards.

Another object of the invention is to provide improved means for controlling the flow of gases to be treated (substrate gases) through enclosures for treating those gases, examples of such gas flows including engine exhaust gases flowing through enclosures for adsorptively, catalytically, or otherwise treating the gases.

Another object of the invention is to provide improved means for controlling the flow of gases to be treated which require no moving parts to be exposed to corrosive or high temperature streams of substrate gases.

Other objects and advantages of the invention will become apparent from the following description thereof.

SUMMARY OF THE INVENTION

The present invention provides improved apparatus for controlling the flow of streams of gases to be treated in automotive exhaust or other gas treatment systems, using flow control jets or sub-streams of secondary air or other diversion fluids in a novel way. The apparatus of the invention allows the substrate gas streams to be efficiently diverted toward desired paths of flow in a treatment enclosure, even in cases where such desired flow paths are paths of higher flow resistance through the system than alternative or lower flow resistance paths.

In a first embodiment, then, the invention includes fluidic apparatus for diverting a substrate gas stream from a first, typically lower-flow-resistance, path to a second, typically higher-flow-resistance path, through an enclosure for both paths. Included in the enclosure as part of the fluidic apparatus is at least one diverter body, that diverter body being disposed on the first path through the enclosure, most typically at an inlet for the substrate gas into that flow path.

The apparatus further includes a conduit connected to a source of a diversion fluid and having an outlet for directing a jet of the diversion fluid, i.e., a flow control stream consisting of a jet of secondary air or other gas or fluid, toward the diverter body. The outlet is positioned sufficiently close to the diverter body that a jet of diversion fluid issuing from the outlet will be deflected from the diverter body and thereby acquire an increased flow component transverse to the direction of flow of the gas stream along the first path.

Through gas jet deflection by the diverter body, the increased flow component or portion of the diverter fluid jet flowing transverse to the flow direction of the substrate gas diverts at least a portion of the substrate gas stream away from the first flow path. In terms of a flow control process, then, the substrate gas stream is redirected from the first flow path to the second flow path through the enclosure by (i) directing the jet of diversion fluid in a first direction toward a diverter body positioned on the first flow path, and (ii) deflecting the jet of diversion fluid from the diverter body to form a diverted fluid flow, the diverted fluid flow having an increased flow component transverse to the first flow path. The diverted fluid flow then impinges on the substrate gas stream, with the result that at least a portion of the substrate gas stream is constrained to follow the second flow path. The efficiency of this diversion process is sufficient to force substantial substrate gas flow along the second path even where the flow resistance of the second path is somewhat higher than that of the first flow path.

While being disposed in a common enclosure, the first and second flow paths used for substrate gas treatment in accordance with the invention will constitute physically separated flow paths through that enclosure. That is, the first and second flow paths within the enclosure will typically be separated from each other by at least one flow-path-dividing wall disposed therebetween.

The jet of diversion fluid entering the enclosure may be directed parallel to the flow direction of the substrate gas stream and thus have no flow component transverse to the direction of flow of the substrate gas prior to deflection by the diverter body. On the other hand, the jet may have some flow components transverse to the substrate gas flow direction, and in that case deflection will serve to increase transverse flow components.

A particular application for the apparatus of the invention is in an engine exhaust system incorporating a hydrocarbon adsorber within such an enclosure and having a burn-off catalyst located in the exhaust stream at a position which is downstream from the adsorber enclosure. The adsorber is constructed, or is positioned within the enclosure, to present two flow paths to the exhaust gases being treated. Thus the enclosure encompasses (1) a first flow path or region, bypassing or traversing the adsorber, which presents an unobstructed or substantially unobstructed flow path through the enclosure to the burn-off catalyst, and (2) a second flow path or region, occupied by the adsorber, which presents a more restricted or higher flow resistance flow path for the exhaust gases traversing the adsorber.

By taking advantage of fluid flow dynamics through an enclosure of this type, combustion of cold start hydrocarbons by the burn-off catalyst disposed downstream from the adsorber can be significantly enhanced and the emission of unburned hydrocarbons during cold-start correspondingly reduced. During the initial or cold-start period of engine operation, the flow diverter is actuated to divert the flow of exhaust gases away from the first flow path on which the diverter body is disposed. Thus at least a portion of the exhaust gas stream is constrained to flow along the second flow path through the adsorber, even though that flow path may offer higher flow resistance than the first flow path.

Following an initial period of engine operation, when the exhaust gases are relatively hot, the diverter is deactivated to allow the relatively hot exhaust gases to flow along the first flow path toward the burn-off catalyst. Since the first flow path is relatively unobstructed, the hot exhaust gases quickly bring the burn-off catalyst to its light-off temperature.

Optionally, as or after the burn-off catalyst has attained its light-off temperature, desorption of adsorbed hydrocarbons from the adsorber may be initiated or accelerated by actuating the jet of diversion fluid to divert at least a portion of the hot exhaust gases through the adsorber. This second diversion step may be continued as desired to more quickly allow hydrocarbon desorption and adsorber reactivation to reach a satisfactory level.

DETAILED DESCRIPTION OF THE INVENTION

It will be appreciated from the foregoing description that the present invention has utility in a variety of systems for treating gas or other fluid streams, including any system wherein the handling of gas flows without the use of mechanical valves or other mechanical means of flow control is required. However, the systems of most immediate interest for such use are those involving the treatment of exhaust emissions from engines or other combustion exhaust gas sources. Accordingly, the following detailed description of the invention will focus principally on such emissions control applications even though the use of the invention is not limited thereto.

For applications involving the absorptive treatment of gas streams such as exhaust gases, e.g., for hydrocarbon removal from the gas stream, the two paths through the enclosure will typically comprise an adsorptive region or path, occupied by a honeycomb or other adsorber for treating the exhaust gases, and a free or open region or path, providing more or less direct access through the enclosure to the burn-off catalyst located downstream therefrom. In general, the free or open path will be a path of lower flow resistance, and thus a path along which the exhaust gas will preferentially flow toward the burn-off catalyst if no means for diversion of the exhaust gas are provided.

For mobile (e.g., automotive) sources of hydrocarbon emissions, adsorbers comprising or consisting of channeled honeycomb structures for contacting the exhaust gases are preferentially used. For purposes of the invention these may be structures which occupy the entire enclosure, i.e., both of the available exhaust gas flow paths, or structures which occupy only one flow path, with a second flow path through the enclosure not containing a honeycomb or other gas-contacting structure. The former types of structures may include a centrally or peripherally disposed region for the first flow path which is open or which comprises cells which are larger and free of absorptive capacity, and a peripheral or other adjacent region of absorptive honeycomb structure occupying the second flow path.

Figure 1:
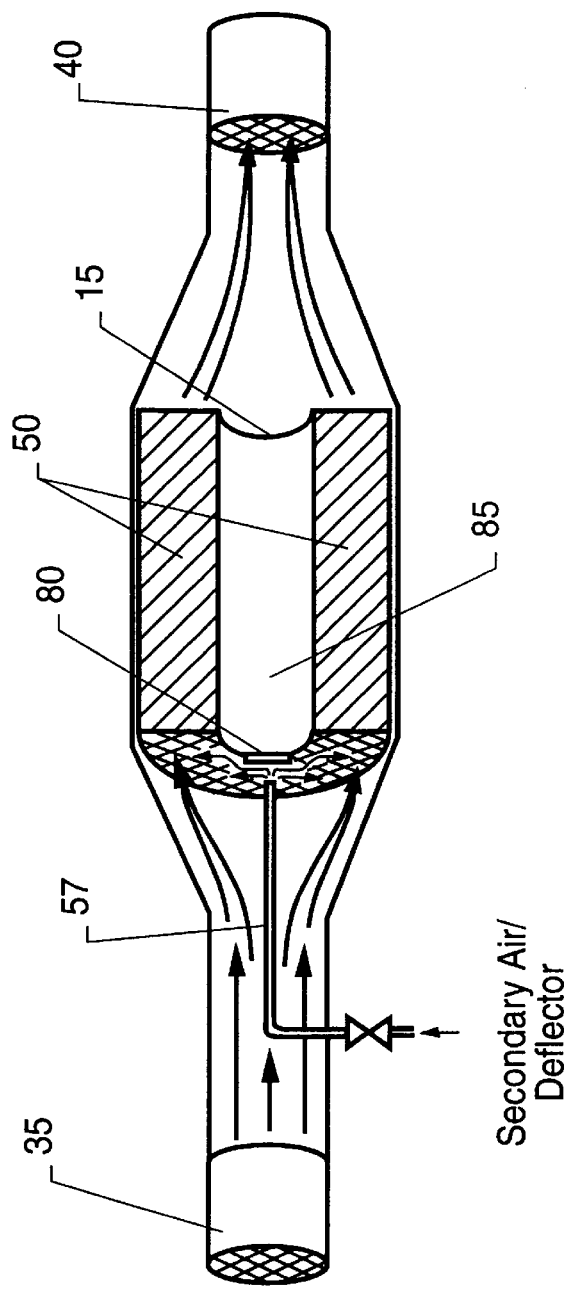
FIG. 1 is a schematic perspective view of an enclosure for a hydrocarbon adsorber utilizing the flow diverter of the invention.

FIG. 1 of the drawing is a schematic elevational cutaway view in partial perspective of a structure comprising two separate regions of flow. In that illustration the adsorber 50 consists of a honeycomb structure into which a center opening 15 has been provided. That center opening provides the first or direct path from a light-off catalyst 35 through the adsorber to a burn-off catalyst 40.

Exhaust gas flow through the central opening 15 through adsorber 50 is controlled using a flow diverter (57, 80) placed at the inlet end of the opening. During cold start, a small, high velocity jet of a diversion fluid from this flow diverter is used to divert exhaust gases (indicated by the large arrows extending from light-off catalyst 35 in FIG. 1) away from the open flow central region (i.e., away from opening 15 which constitutes the first path through the adsorber enclosure). The exhaust gases are thus directed towards the peripheral or honeycomb regions of adsorber 50, as indicated by the large arrows entering the honeycomb portions of adsorber 50, those portions offering the second or adsorptive path through the enclosure.

The diverter in FIG. 1 comprises a thin tubular air injection port 57, running parallel to the exhaust gas flow and fitted with a diverter body consisting of diverter plate 80, positioned adjacent the outlet of injection port 57 at the inlet end of the adsorber opening. Control over the flow of exhaust gas is achieved by projecting a jet of diversion fluid, in this case a jet of added or secondary air from an air source indicated as Secondary Air/Deflector, the jet being projected from air tube 57 toward the diverter plate.

Deflection of the exhaust gas stream from open passage 15 during cold start is achieved by deflection of the secondary air jet from plate 80 to form a radially directed secondary air flow. This radially directed air flow, shown by the small arrows generally indicated as 85 in FIG. 1 which extend outwardly from tube 57 adjacent plate 80, is approximately perpendicular to the direction of the exhaust gas flow.

The air flow provided by the combination of air injection port 57 with diverter plate 80 can be viewed as diverting the exhaust gases by blocking passage of exhaust gases through opening 15. That is, the secondary air flow may form a shield to restrict exhaust gas flow through opening 15, thus forcing flow through adsorptive region 50 of the adsorber during the cold start interval.

Once the light-off catalyst 35 in FIG. 1 has attained its light-off temperature, the flow diverter may be deactivated, thus allowing the exhaust gases, which by now are relatively hot, to flow to the burn-off catalyst 40 through the open core central region 15. In this way the burn-off catalyst 40 is quickly brought to its light-off temperature. After the burn-off catalyst has attained its light-off temperature, some portion of the exhaust gases continue to flow through the adsorber to aid with desorption.

One advantage of using a control gas jet of secondary air from an external air supply to control flow in the embodiment of FIG. 1 is that the relatively cool jet of secondary air permits the adsorber (e.g., a molecular sieve structure) to maintain a low temperature. Low adsorber temperatures favor sustained adsorption and retard desorption until light-off of the burn-off catalyst has been achieved.

The source of secondary air for use as the diversion fluid is not critical and may comprise, for example, a simple air injection pump connected to the end of the conduit opposite the conduit outlet. Another suitable source of secondary air could be an existing turbocharger on an engine to be fitted with the diverter system.

One useful alternative to the use of secondary air in these systems is the use of other sources of diversion fluid from the engine. The use of secondary air can have the effect of diluting the exhaust or other substrate gas, in some cases substantially. An adverse effect of this dilution is to lower the partial pressure, in the substrate gas stream, of the hydrocarbons or other species to be treated. The lowered partial pressures of course result in lower levels of adsorption or reaction in the treatment bed. To avoid such dilution, an aliquot of the exhaust or other substrate gas can be used in place of secondary air as the source of control gas. This aliquot can be drawn from a downstream or upstream source of exhaust within the exhaust system, and can be supplied to the diverter using auxiliary pumping means to regulate the pressure of the control gas stream as required.

Although the diverter body of FIG. 1 of the drawings is disposed at the inlet end of opening 15, it may in principle be positioned at any of a variety of locations on the first flow path for exhaust gases through the enclosure. The location proximate to the inlet or point of entry of the exhaust gas into that first flow-path is preferred, however, since it is at this location that the diverted jet of air or other diversion fluid can most efficiently divert the exhaust gas stream away from the first flow path and toward the second flow path through the adsorber. Efficient diversion is particularly important where the flow resistance of the second path through the enclosure, e.g., the flow path through the adsorber, is relatively high.

Figure 2:
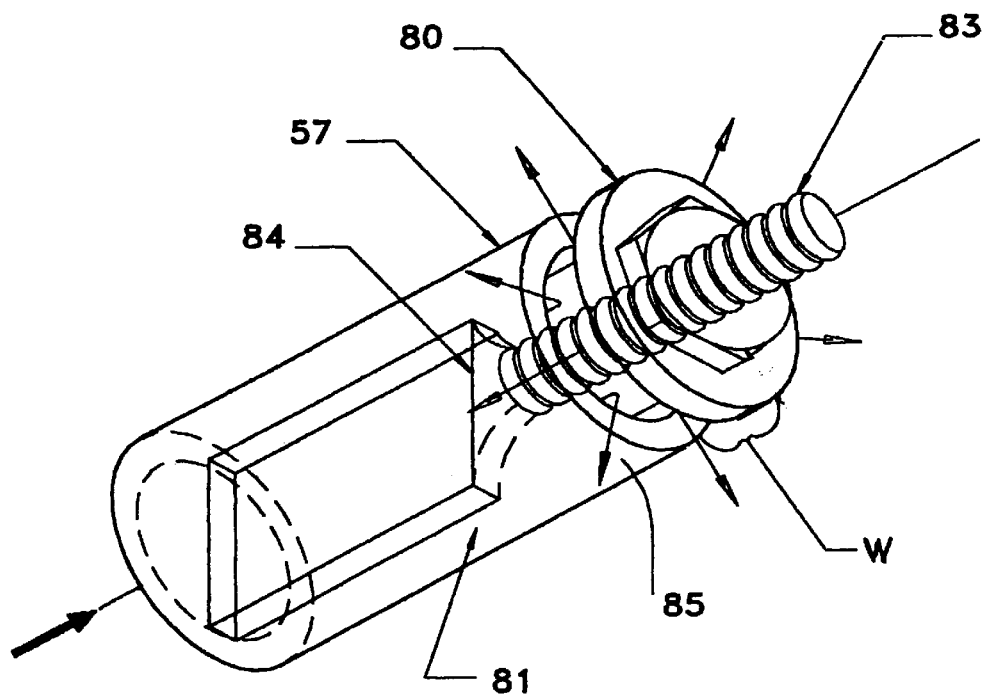
FIG. 2 is an enlarged schematic illustration of a diverter apparatus according to the invention.

The diverter body itself can take various forms, but is preferably of a configuration which will present minimal obstruction to direct exhaust or substrate gas flow through the first path within the enclosure when no control gas flow is provided. FIG. 2 of the drawings illustrates one configuration for such a diverter body, that configuration being one of a small round diverter plate adjacent the outlet for the jet of control gas.

Referring more particularly to FIG. 2, diverter plate 80 is positioned directly in front of the gas outlet or air injection port of supply tube 57, that position being maintained by means of a diverter plate support system 81. Support system 81 consists of a support member which is secured within the inside circumference of air supply tube 57 and connected to a threaded post 83 which extends out of the supply tube. Diverter plate 80 is moveable along threaded post 83, allowing for width W, which is the width of the slot or gap formed between diverter plate 80 and the outlet of tube 57, to be varied. The preferred slot width W will normally be that width which results in an air flow which is perpendicular to the direction of the exhaust gas, although the slot width may be increased to provide a radial flow which is more cone-like in shape if desired.

In absorptive engine exhaust emissions control apparatus such as illustrated in FIG. 1, the optimal area of the central adsorber opening will be empirically determined for each system designed, taking into account factors such as engine size, exhaust gas flow rate, the volume of the adsorber, the geometric surface area of the adsorber, the efficiency of the particular adsorber material, the operating conditions of the engine, and other variables. However, with efficient diverter systems, the central opening size can be larger and the volume of adsorbent used can be smaller than with no effective diverter system, since the diverter can force exhaust gas flow through the adsorber when required.

As previously noted, while an open channel through the adsorber helps to bring a downstream burn-off catalyst quickly to its light-off temperature, alternative adsorber configurations can also be effective for this purpose. One such construction is a honeycomb adsorber body wherein a region of less obstructed flow along a first region of the adsorber, e.g., a central region through the honeycomb, is created by providing cells in that region which are larger than those forming the peripheral region of the honeycomb. The region of larger cell size presents an exhaust flow path of lowered flow resistance, through which exhaust gases can more easily and with less cooling flow toward a downstream burn-off catalyst.

Figure 3C:
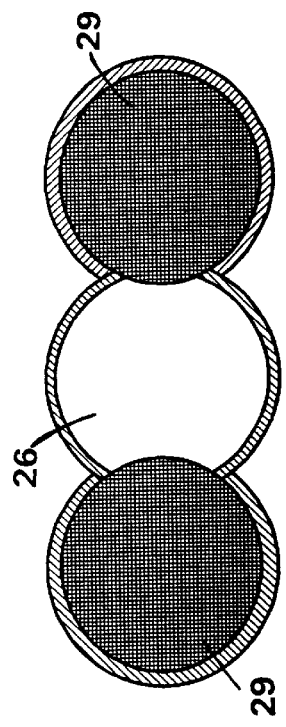
FIGS. 3A–3C are schematic cross-sectional views of enclosures and enclosed adsorbers illustrating flow paths for substrate gases through the enclosures.
Figure 3A:
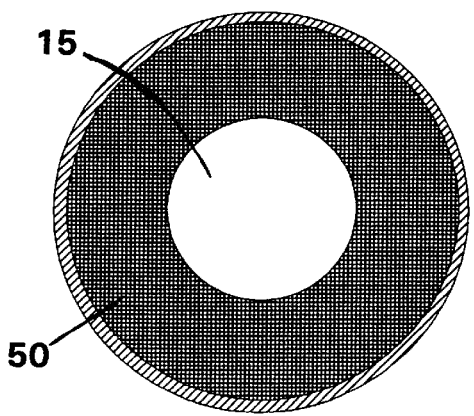
Figure 3B:
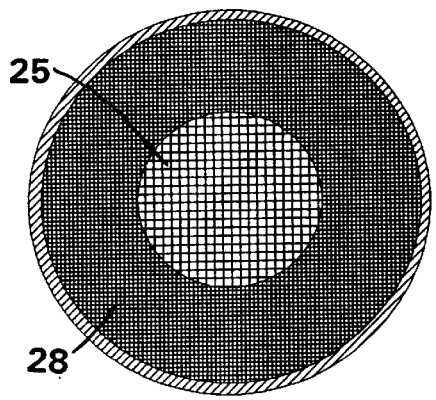

A comparison of various alternative adsorber and/or enclosure constructions providing first and second flow paths is provided in FIGS. 3A–3C of the drawing. FIG. 3A is a schematic cross-sectional illustration of an enclosure and adsorber such as illustrated in FIG. 1, wherein the central opening 15 in honeycomb adsorber 50, providing the first flow path through the enclosure, is shown. FIG. 3B illustrates an adsorber construction comprising an area 25 of enlarged cell shape for the first flow path, disposed within a peripheral cell region 28 incorporating the second or adsorptive flow path.

In yet another configuration for providing alternative selectable flow paths through an adsorber or other gas treatment bed, the honeycomb structure or other treatment bed comprising the second path may be disposed adjacent to rather than surrounding the first flow path. FIG. 3C is a schematic cross-sectional view of an enclosure of this latter type, wherein first flow path 26 is simply an opening through the enclosure which is not occupied by honeycomb adsorbers 29. Positioning the fluidic diverter at a location such as the exhaust gas inlet to flow path 26 will thus permit some or all of the exhaust gas flowing into the enclosure to be diverted to adsorbers 29.

In fact, the operability of the diverter does not require the use of an adsorber or other gas treatment bed having an opening or other region of lowered flow resistance therethrough. This is because preferential gas flow is observed even in fluid treatment systems without such openings. An example of such a system is a standard exhaust gas enclosure for a catalyst or adsorber similar to that shown in FIG. 1 of the drawing, but containing a homogeneous or non-ported cellular honeycomb adsorber or catalyst. That is, no central opening 15 is provided in the honeycomb.

In this type of system the exhaust gases tend to flow through the central region of the catalyst or adsorber at a faster rate than through the peripheral regions of the structures, simply due to the cone-shaped exhaust can design and the central positioning of the generally circular honeycomb in front of the exhaust gas stream entering the can from the conduit containing light-off catalyst 35. The central region in this type of system may constitute a preferred or first flow path through the enclosure or can, with the collective flow channels through peripheral regions of the honeycomb constituting a less preferred or second flow path through the enclosure.

The diverter systems of the present invention can provide an effective means for controlling the flow through such enclosed honeycombs by reducing or preventing flow along the first or high gas flow honeycomb section through the enclosure, thus preferentially directing flow along the second path through peripheral sections of the honeycomb. And in fact the same flow dynamics, offering the same opportunities for flow control, are observed even in non-symmetrical can designs, since substrate gases passing through enclosures containing homogenous beds for treating such gases will tend to flow faster through that section within the bed which provides the most direct path between the inlet and outlet conduits of the enclosure. Once the location of this path has been determined, placement of the diverter for most effective flow control through the enclosure may be optimized.

For the purposes of the present description, the terms "adsorber" and "adsorption" are used to encompass both adsorption and absorption as these terms are generally known to persons skilled in the art and as defined in *Webster's Ninth New Colleaiate Dictionary* (1985). Either or both of the processes of adsorption and absorption may occur in the adsorbers utilized for exhaust gas treatment using the methods of the invention.

As is evident from the above description, adsorber structures acting as hydrocarbon traps or molecular sieves in accordance with the invention may be utilized in any number of forms. For example, a molecular sieve such as a zeolite may be utilized directly in the form of beads or pellets, or it may be embedded in, or coated on porous substrates. The molecular sieve materials can be applied onto the substrates by any known method such as for example, by conventional washcoat or spraying techniques. In the washcoat technique, the substrate is contacted with a slurry containing the molecular sieve and other components such as temporary binders, permanent binders or binder precursors, dispersants, and/or any other desired additives, Washcoating methods are well known in the art. Permanent binders for such washcoating slurries may include, for example, aluminum oxide and its precursors, silica, titania, zirconia, rare earth oxides, and their precursors, spinel and precursors. The molecular sieve slurry may be applied (for example, by repeated spraying or dipping) to the substrate until the desired amount of molecular sieve material has been applied.

One useful method for forming zeolite on the surface of a substrate is disclosed in U.S. Pat. No. 3,730,910, herein incorporated by reference.

In alternative embodiment the molecular sieve is zeolite in the form of a porous monolithic structure formed by extruding the zeolite into a honeycomb structure. U.S. Pat. No. 4,381,255, herein incorporated by reference, discloses a process for producing binderless zeolite extrudates by extruding a mixture containing equal amounts of a zeolite powder, a metakaolin clay and a near stoichiometric caustic solution, in which the clay in the extrudate crystallizes to form a coherent particle that is essentially all zeolite. Similarly, U.S. Pat. No 4,637,995, herein incorporated by reference, discloses a method for preparing a monolithic zeolite support comprising a ceramic matrix having zeolite dispersed therein.

Zeolites comprise only one class of molecular sieves useful in the invention, that class more generally comprising any inorganic crystalline substances or structures having pore sizes suitable for adsorbing molecules. The term is generally used to describe a class of materials that exhibit selective absorption properties. To be a molecular sieve, the material must separate components of a mixture on the basis of molecular size and shape differences. Such materials include silicates, the metallosilicates, metalloaluminates, the $AlPO_4$s, silico- and metalloaluminophosphates, zeolites and others described in R. Szostak, *Molecular Sieves: Principles of Synthesis and Identification*, pages 2–6 (Van Nostrand Reinhold Catalysis Series, 1989).

Particular zeolites which can be used are more fully disclosed in U.S. Pat. No. 3,702,886, in British Specification No. 1,334,243, published Oct. 17, 1973, in U.S. Pat. No. 3,709,979, and in U.S. Pat. No. 3,832,449, all of which are herein incorporated by reference. These may be used alone or as mixtures or combinations of zeolites or other molecular sieve materials. Specific classes of useful molecular sieve materials include silicates (such as the metallosilicates and titanosilicates) of varying silica-alumina ratios, metalloaluminates (such as germaniumaluminates), metallophosphates, aluminophosphates (such as silico- and metalloaluminophosphates (MeAPO), SAPO, MeAPSO), gallogerminates and combinations of these. Examples of zeolites which are particularly useful for the invention include, ZSM-5, Beta, gmelinite, mazzite, offretite, ZSM-12, ZSM-18, Berryllophosphate-H, boggsite, SAPO-40, SAPO-41, and combinations of these, most preferably, ZSM-5, Beta, Ultra-stable Y (USY), and mordenite. For these applications, zeolites having high silica/alumina ratios (greater than 10), are more thermally stable and are therefore preferred. Alternatively, for gas treatment applications maintained under reducing conditions, activated carbon may be the material of choice.

It is well known that during cold start, molecular sieve zeolites not only trap hydrocarbons but also cause cracking of some hydrocarbons (i.e., coking). To prevent coking, the adsorber may be catalyzed with suitable catalysts. As is well known in the art, noble metal oxidation catalysts such as platinum, rhodium, and palladium, may be added to zeolite molecular sieve to ensure oxidation of the carbonaceous materials which may result from coking.

Any catalyst capable of converting hydrocarbons to water and carbon dioxide may also be added to the zeolite. Such catalysts are well known in the art. For example, noble metal catalysts, such as platinum, rhodium, palladium, and mixtures of these are widely used in automotive catalytic converters. It is also known that certain zeolite/noble metal combinations such as disclosed in co-assigned U.S. Pat. No. 5,244,852 (herein incorporated by reference) function as three-way catalysts to convert. These catalysts are capable not only of oxidizing hydrocarbons but also of converting carbon monoxide and NOx in the engine exhaust stream to innocuous products. Any of these catalysts may be incorporated into the adsorber or molecular sieve structure by known methods.

The preferred support or substrate for treating streams of gases in these systems is a monolithic substrate, i.e., a unitary body or substrate formed from, or incorporating, the selected molecular sieve material. The particularly preferred monolithic substrate is a honeycomb substrate, although not all monolithic substrates are honeycomb substrates. Honeycomb substrates may be formed of any material suitable for high temperature application such as certain metals, metal alloys, ceramics, glass-ceramics, glass, high surface area-high temperature stable oxides, and combinations of these materials. Examples of useful substrate materials include, cordierite, mullite, clay, talc, zircon, zirconia, spinel, alumina, silica, borides, lithium aluminosilicates, alumina silica, feldspar, titania, fused silica, nitrides, carbides and mixtures of these. Useful metals for the substrate include, substrates formed of iron group metals such as Fe—Al, Fe—Cr—Al alloys, stainless steel, and Fe-Nickel alloys.

The above-described structures and apparatus can be combined into an in-line engine exhaust treatment system providing particularly efficient adsorption of hydrocarbons during the cold-start phase of engine operation. The preferred system comprises a housing disposed downstream from the engine having an inlet and outlet end through which the exhaust gas stream from the engine flows. Centrally disposed in the housing is a molecular sieve structure having an inlet and outlet end, most preferably a structure of the extruded honeycomb type comprising a cellular peripheral region incorporating a plurality of cells running longitudinally parallel between the inlet and outlet ends of the honeycomb. The peripheral region surrounds an open core central region running longitudinally (parallel to the cells) between the inlet and the outlet ends of the structure. Downstream from the housing enclosing the molecular sieve structure is a burn-off catalyst through which exhaust gases exiting the housing flow.

This arrangement of the molecular sieve structure in the housing provides first and second flow paths for the exhaust gas stream to pass through the housing. The first flow path extends from the inlet end to the outlet end of the housing and passes through the open core central region of the sieve structure. This flow path provides a substantially unobstructed path for exhaust gases to pass from the engine to the burn-off catalyst located downstream from the housing. The second flow path for the exhaust gas stream is provided by the molecular sieve structure itself, that path extending through the cellular peripheral region of the molecular sieve.

The fluidic apparatus for diverting the exhaust gases from the first flow path to the second flow path through the enclosure comprises a diverter body disposed on the first flow path through the central opening in the sieve structure. Further provided is a conduit, connected to a source of diversion fluid outside of the housing, the conduit having an outlet within the housing for directing the diversion fluid toward the diverter body. The outlet is positioned sufficiently close to the diverter body to permit the body to deflect and impart to the diversion fluid an increased flow component transverse to the direction of flow of the exhaust gases along the first flow path. This transverse flow effectively blocks exhaust gas flow through the central opening in the sieve structure.

In a specific, illustrative, hypothetical example of a system such as described, a round cordierite extruded honeycomb substrate having an outside diameter of 4.66 inches and a frontal area of 17.05 square inches is cut into six samples each measuring 4 inches in length. Three of the samples are washcoated with ZSM-5, a zeolite known to adsorb low molecular weight hydrocarbons, and the remaining three samples are washcoated with ultra stable Y (USY), a zeolite known to have good adsorption capacity for higher molecular weight hydrocarbons.

One of the ZSM-5 coated samples is drilled with a hole through its center measuring 0.5" and another with a hole measuring 0.75" running longitudinally between the two end faces of the substrate and parallel to the cells. Similarly, one of the USY coated samples is drilled with a hole measuring 0.5" and another with a hole measuring 0.75". The control adsorber consists of one each of the ZSM-5 and USY coated samples without holes.

One ZSM-5 coated adsorber sample and one USY-coated sample, each sample having a 0.75" hole, are placed in series with center holes aligned in an adsorber housing such as shown in FIG. 1 of the drawing. A diverter assembly is provided at a location immediately in front of the center hole inlet, also as shown in the drawing, that diverter assembly comprising a thin tubular air injection port entering the enclosure from an upstream location in the exhaust feed pipe and running parallel to the exhaust gas flow to the location in front of the hole.

Positioned at the inlet to the center hole and directly in front of the outlet from the air injection port is a diverter body consisting of a small, flat, circular diverter plate. The diverter plate is mounted in front of the air injection port on a threaded post which is secured to the inside wall of the tubular port, substantially as shown in FIG. 2 of the drawing. The position of the diverter plate on the threaded post is adjusted so that air from the injection port, when deflected from the plate, has a flow component perpendicular to the direction of exhaust gas flow toward the center hole. Deflected secondary air will form a radially directed air stream flowing outwardly in all directions from the diverter plate, the radially directed stream effectively blocking off exhaust gas passage into the hole downstream from the diverter. Thus the air injection port used in combination with the diverter plate combine forms a radial air curtain or shield which prevents exhaust gas flow through the central region of the adsorber during cold start.

The effectiveness of diverter apparatus such as described is reflected by the degree to which a simulated exhaust gas in a test system can be successfully prevented from passing through the hole during operation of the diverter. One such test system has a diverter activated in a configuration similar to that illustrated in FIGS. 1 and 2 of the drawing.

To evaluate diverter performance, a simulated exhaust gas (air) is passed into the adsorber housing at a volumetric flow rate of 40 cubic feet per minute (cfpm), producing a peak gas flow rate through the adsorber center opening (hole) of 2300 feet per minute. With the simulated exhaust gas flowing at the specified rate, the flow diverter is activated by passing secondary air through the air injection port to form a radially directed air shield over the entrance to the hole.

Using a probe positioned in the region of the hole at the outlet end of the adsorber, the linear velocity of the exhaust gas (simulated) passing through the hole can be measured as a function of the secondary air volumetric flow rate over the range of 0–3.5 cubic feet per minute (cfpm). When this measurement is made, it is found that, as the secondary air flow rate increases, the simulated exhaust gas is increasingly diverted to the peripheral regions of the adsorber. This diversion is indicated by a marked decrease in the exhaust gas flow rate through the hole as measured by the probe. The higher the secondary air flow rate, the stronger the air jet, and the more the amount of simulated exhaust gas diverted.

The use of these flow diverters permits the use of adsorbers having relatively large hole sizes, since the diverter can be used to direct substantially all of the exhaust gases away from the central region and into the peripheral regions. Hole sizes as high as 50% of the adsorber frontal area or more can be used, provided that the remaining adsorber is capable of adsorbing a sufficient amount of the hydrocarbons during cold start to meet the FTP test standards.

When using a flow control apparatus in an automotive exhaust system such as shown in FIG. 1 of the drawing, the burn-off catalyst 40 comes to its light-off temperature quicker because the portion of the exhaust flowing through the central hole, avoids contact with the adsorber which has a certain thermal mass and which therefore acts as a heat sink. Thus permitting unrestricted flow through the center hole in the adsorber at the appropriate time in the cold start cycle causes the heat in the exhaust stream to be transferred directly to the burn-off catalyst downstream from the adsorber.

We have found that by using the diverter construction described herein, the burn-off catalyst reaches its light-off temperature before the adsorber attains its desorption temperature, thus avoiding premature desorption which has been a problem with some existing adsorption systems. Once the light-off catalyst has attained its light-off temperature it soon attains its full operating temperature and is then capable of converting the NOx, hydrocarbon, and carbon monoxide in the exhaust stream.

Secondary air from the same or a separate source may also be used as needed during vehicle operation to control the adsorber temperature. For example, after the engine has heated up, secondary air can be injected into the adsorber in the same manner described above, to provide cooling air to the adsorber after the engine has heated. This additional secondary air will operate to maintain the adsorber at temperatures below its desorption temperature in the period prior to the burn-off catalyst attaining its light-off temperature to prevent premature desorption. In addition, secondary air may be introduced into the housing at any time as needed for example, to restore stoichiometry, or in certain applications, to provide additional air that may be necessary for oxidation.

In addition to the embodiments discussed above, it will be clear to persons skilled in the art that numerous modifications and changes can be made to the above invention without departing from its intended spirit and scope.

We claim:

1. Fluidic apparatus for diverting a substrate gas stream from a first flow path to a second flow path of higher flow resistance through an enclosure for both flow paths which comprises:

a diverter body within the enclosure disposed on the first flow path;

a molecular sieve structure disposed on the second flow path;

a conduit connected to a source of diversion fluid and having an outlet within the enclosure for directing the diversion fluid toward the diverter body;

the outlet being positioned sufficiently close to the diverter body to permit the body to deflect and impart to the diversion fluid an increased flow component transverse to the direction of flow of the substrate gas stream along the first path, the diversion fluid thus deflected being effective to direct at least a portion of the substrate gas stream, impinged upon by the diversion fluid, along the second flow path of higher flow resistance and through the molecular sieve structure.

2. The fluidic apparatus of claim 1 wherein the substrate gas stream is a combustion engine exhaust gas stream.

3. The fluidic apparatus of claim 1 wherein the conduit is a tubular air injection port and the diverter body is a diverter plate.

4. The fluidic apparatus of claim 1 wherein the molecular sieve structure is a honeycomb structure having an inlet end and an outlet end, the structure being selected from the group consisting of (1) a variable cell honeycomb structure having a first group of cells and a second group of cells whose cell sizes are smaller than the first group of cells, and (2) a substantially cellular structure having an open core region running longitudinally parallel between the inlet and outlet ends of the structure and a peripheral region abutting the open core, the peripheral region having a plurality of cells running longitudinally parallel between the inlet and the outlet ends of the structure.

5. The fluidic apparatus of claim 4 wherein the first flow path traverses the first group of cells or the open core region.

6. The fluidic apparatus of claim 4, wherein the molecular sieve structure is centrally disposed in the housing, wherein the first path through the enclosure comprises the central open core, and wherein the second path comprises the peripheral cellular region.

7. The fluidic apparatus of claim 6, wherein the central open core occupies an area in the range of 0.5 to 50% of the frontal area of the honeycomb structure.

8. The fluidic apparatus of claim 1 wherein the molecular sieve structure comprises extruded zeolites selected from the group consisting of ZSM-5, USY, Mordenite, Beta zeolites and combinations of these.

9. The fluidic apparatus of claim 1 wherein the molecular sieve structure comprises zeolites supported on a substrate.

10. The fluidic apparatus of claim 9 wherein the substrate is in a form selected from the group consisting of pellets and cellular monoliths.

11. The fluidic apparatus of claim 9 wherein the substrate is an extruded honeycomb structure.

12. An in-line engine exhaust system comprising:

a housing disposed downstream from an engine and having an inlet and outlet end for an exhaust gas stream from the engine;

a molecular sieve structure having an inlet and outlet end centrally disposed in the housing, the molecular sieve structure comprising an extruded honeycomb structure having a cellular peripheral region having a plurality of cells running longitudinally parallel between the inlet and outlet ends of the structure, the peripheral region surrounding an open core central region also running longitudinally parallel between the inlet and the outlet ends of the structure;

a burn-off catalyst having a light-off temperature disposed downstream from the molecular sieve structure;

a first flow path for the exhaust gas stream extending from the inlet end to the outlet end of the housing and through the open core central region, the first flow path providing a substantially unobstructed flow path for exhaust gases in the exhaust stream from the engine to the burn-off catalyst;

a second flow path for the exhaust gas stream extending through the cellular peripheral region; and fluidic apparatus for diverting the exhaust gases from the first flow path to the second flow path which comprises a diverter body disposed on the first flow path and a conduit connected to a source of diversion fluid and having an outlet within the housing for directing the diversion fluid toward-the diverter body, the outlet being positioned sufficiently close to the diverter body to permit the body to deflect and impart to the diversion fluid an increased flow component transverse to the direction of flow of the exhaust gases along the first flow path.

13. The exhaust system of claim 12 wherein the diverter body is disposed adjacent the central core region at the inlet end of the molecular sieve structure.

14. The exhaust system of claim 12 wherein the molecular sieve structure comprises zeolites supported on a substrate.

15. The exhaust system of claim 14 wherein the molecular sieve structure further comprises a catalyst.

16. A method for diverting a substrate gas stream of engine exhaust gas from a first flow path to a second flow path through an enclosure for both flow paths, wherein an extruded honeycomb molecular sieve structure is disposed on the second flow path and the second flow path has a higher flow resistance than the first flow path, which comprises:

directing a jet of diversion fluid in a first direction toward a diverter body positioned on the first flow path;

deflecting the jet of diversion fluid from the diverter body to form a diverted fluid flow, the diverted fluid flow having an increased flow component transverse to the first flow path; and impinging the diverted fluid flow on the substrate gas stream to direct at least a portion of the substrate gas stream along the second flow path and through the molecular sieve structure.

17. A method in accordance with claim 16 wherein the diversion fluid is supplied from a source of secondary air.

18. A method in accordance with claim 17 wherein the secondary air is supplied by a pump.

19. A method in accordance with claim 17 wherein the secondary air is supplied from an engine supercharger.

20. A method in accordance with claim 16 wherein the diversion fluid comprises engine exhaust gas.

21. A method in accordance with claim 16 wherein the molecular sieve structure is a honeycomb structure having an inlet end and an outlet end, the structure being selected from the group consisting of (1) a variable cell honeycomb structure having a first group of cells and a second group of cells whose cell sizes are smaller than the first group of cells, and (2) a substantially cellular structure having an open core region running longitudinally parallel between the inlet and outlet ends of the structure and a peripheral region abutting the open core, the peripheral region having a plurality of cells running longitudinally parallel between the inlet and the outlet ends of the structure.

22. A method in accordance with claim 21 wherein the first flow path traverses the first group of cells.

23. A method in accordance with claim 21 wherein the first flow path traverses the open core region.

24. A method in accordance with claim 16 wherein the molecular sieve structure is disposed adjacent to the first flow path.

* * * * *